United States Patent
Nishida (10) Patent No.: US 7,555,384 B2
(45) Date of Patent: Jun. 30, 2009

(54) MOBILE OBJECT POSITION DETECTING APPARATUS

(75) Inventor: Junichi Nishida, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 768 days.

(21) Appl. No.: 10/777,141

(22) Filed: Feb. 13, 2004

(65) Prior Publication Data

US 2004/0210384 A1    Oct. 21, 2004

(30) Foreign Application Priority Data

Feb. 14, 2003   (JP)   ............... 2003-036262

(51) Int. Cl.
*G01C 21/00*   (2006.01)

(52) U.S. Cl. ............. 701/207; 701/208; 340/989; 340/438; 342/357.13

(58) Field of Classification Search ......... 701/207–208, 701/29; 340/988–989, 425.5, 438, 991–994; 342/357.12, 357.13; 455/456.1, 456.2, 456.3, 455/457, 420
See application file for complete search history.

(56) References Cited

U.S. PATENT DOCUMENTS

| | | | | |
|---|---|---|---|---|
| 4,885,690 A | * | 12/1989 | Schimmel et al. | ............... 701/54 |
| 5,067,082 A | * | 11/1991 | Nimura et al. | ............... 701/208 |
| 5,121,324 A | * | 6/1992 | Rini et al. | ................... 701/105 |
| 5,670,830 A | * | 9/1997 | Koga et al. | ................. 307/10.1 |
| 5,901,684 A | * | 5/1999 | Fiaschetti et al. | ........... 123/436 |
| 5,969,595 A | * | 10/1999 | Schipper et al. | ........ 340/426.19 |
| 6,070,122 A | * | 5/2000 | Ishida et al. | ................ 701/208 |
| 6,127,964 A | * | 10/2000 | Kageyama | ................... 342/70 |
| 6,151,552 A | * | 11/2000 | Koizumi et al. | ............. 701/211 |
| 6,192,312 B1 | * | 2/2001 | Hummelsheim | ............ 701/118 |

(Continued)

FOREIGN PATENT DOCUMENTS

DE    3501276 C   *   7/1989

(Continued)

OTHER PUBLICATIONS

Markov-Based Lane Positioning Using Intervehicle Communication: Thanh-Son Dao; Leung, K.Y.K.; Clark, C.M.; Huissoon, J.P.; Intelligent Transportation Systems, IEEE Transactions on: vol. 8, Issue 4, Dec. 2007 pp. 641-650: Digital Object Identifier 10.1109/TITS.2007.908574.*

(Continued)

*Primary Examiner*—Cuong H Nguyen
(74) *Attorney, Agent, or Firm*—Finnegan, Henderson, Farabow, Garrett & Dunner, LLP.

(57) ABSTRACT

A control unit 10 detects the presence/absence of receiving position information based on the position data provided from a GPS receiver 14. While the GPS receiver 14 is supplying no position data, the control unit 10 computes the travel distance of a vehicle according to a vehicle speed pulse signal input from a vehicle speed pulse input unit 18. When the obtained travel distance exceeds a predetermined distance, the control unit 10 determines abnormal reception due to faulty equipment. The predetermined distance is set in advance based on a reception disability area, etc. When the control unit 10 determines abnormal reception due to faulty equipment, it turns on an orange indicator. Thus, the person in the vehicle can recognize the abnormal reception due to faulty equipment.

14 Claims, 7 Drawing Sheets

U.S. PATENT DOCUMENTS

| | | | |
|---|---|---|---|
| 6,320,536 B1* | 11/2001 | Sasaki | 342/357.15 |
| 6,385,540 B1* | 5/2002 | Ajima | 701/213 |
| 6,388,613 B1* | 5/2002 | Nagatsuma et al. | 342/357.08 |
| 6,445,990 B1* | 9/2002 | Manring | 701/50 |
| 6,498,983 B2* | 12/2002 | Hashida | 701/207 |
| 6,791,456 B2* | 9/2004 | Nakayama et al. | 340/429 |
| 6,810,325 B2* | 10/2004 | Amano et al. | 701/207 |
| 7,283,810 B1* | 10/2007 | Arakawa et al. | 455/414.1 |
| 2002/0133279 A1* | 9/2002 | Manring | 701/50 |

FOREIGN PATENT DOCUMENTS

| | | | |
|---|---|---|---|
| GB | 2154524 A * | 9/1985 | |
| JP | 6-318894 | 11/1994 | |
| JP | 08019114 A * | 1/1996 | |
| JP | 08101265 A * | 4/1996 | |
| JP | 11-272974 | 10/1999 | |
| JP | 11-304530 * | 11/1999 | |
| JP | 3016349 B2 * | 3/2000 | |
| JP | 2000-163613 * | 6/2000 | |
| JP | 2002-22664 | 11/2000 | |
| JP | 2001-21590 | 1/2001 | |
| JP | 2002-279594 | 9/2002 | |
| JP | 2002362318 A * | 12/2002 | |
| JP | 2003057327 A * | 2/2003 | |
| JP | 2004012288 A * | 1/2004 | |
| JP | 3537504 B2 * | 6/2004 | |

OTHER PUBLICATIONS

Survey of Wireless Indoor Positioning Techniques and Systems: Hui Liu; Darabi, H.; Banerjee, P.; Jing Liu; Systems, Man, and Cybernetics, Part C: Applications and Reviews, IEEE Transactions on: vol. 37, Issue 6, Nov. 2007 pp. 1067-1080 Digital Object Identifier 10.1109/TSMCC.2007.905750.*

Two-Layer multistate Markov model for modeling a 1.8 GHz narrow-band wireless propagation channel in urban Taipei city Hsin-Piao Lin; Ming-Jian Tseng; Vehicular Technology, IEEE Transactions on; vol. 54, Issue 2, Mar. 2005 pp. 435-446; Digital Object Identifier 10.1109/TVT.2004.851423.*

Vehicular Node Localization Using Received-Signal-Strength Indicator; Parker, R.; Valaee, S.; Vehicular Technology, IEEE Transactions on; vol. 56, Issue 6, Part 1, Nov. 2007 pp. 3371-3380; Digital Object Identifier 10.1109/TVT.2007.907687.*

Power matching approach for GPS coverage extension; Saab, S.S.; Kassas, Z.M.; Intelligent Transportation Systems, IEEE Transactions on; vol. 7, Issue 2, Jun. 2006 pp. 156-166; Digital Object Identifier 10.1109/TITS.2006.874720.*

Comparative Performance Analysis of a Kalman Filter and a Modified Double Exponential Filter for GPS-Only Position stimation of Automotive Platforms in an Urban-Canyon Environment;Aloi, D.N.; Korniyenko, O.V.; Vehicular Technology, IEEE;Transactions on;vol. 56, Issue 5, Part 2, Sep. 2007 pp. 2880-2892;Digital Object Identifier 10.1109.*

Vehicle Localization in Vehicular Networks; Parker, R.; Valaee, S.; Vehicular Technology Technology Conference, 2006. VTC-2006 Fall. 2006 IEEE 64$^{th}$; Sep. 25-28, 2006 pp. 1-5; Digital Object Identifier 10.1109/VTCF.2006.557.*

Vehicle localization in outdoor woodland environments with sensor fault detection; Morales, Y.; Takeuchi, E.; Tsubouchi, T.; Robotics and Automation, 2008. ICRA 2008. IEEE International Conference on; May 19-23, 2008 pp. 449-454 Digital Object Identifier 10.1109/ROBOT.2008.4543248.*

Preliminary biochemical fuel cell investigations, Colichman, E.L.; Proceedings of the IEEE, vol. 51, Issue 5, May 1963 pp. 812-819.*

Generation reliability impacts of industry-owned distributed sources, Chowdhury, A.A.; Koval, D.O.; Industry Applications Conference, 2003. 38th IAS Annual Meeting. Conference Record of the, vol. 2, Oct. 12-16, 2003 pp. 1321-1327 vol. 2.*

Thermal management of portable micro fuel cell stacks, Hahn, R.; Krumm, M.; Reichl, H.; Semiconductor Thermal Measurement and Management Symposium, 2003. Ninteenth Annual IEEE, Mar. 11-13, 2003 pp. 202-209, Digital Object Identifier 10.1109/STHERM.2003.1194363.*

Cost-effective energy system measures studied by dynamic modelling, Andersson, M.; Bjork, C.; Karlsson, B.; Advances in Power System Control, Operation and Management, 1993. APSCOM-93., 2nd International Conference on, Dec. 7-10, 1993 pp. 448-455 vol. 1.*

Japanese Office Action dated Jan. 29, 2008.

* cited by examiner

MOBILE OBJECT POSITION DETECTING APPARATUS

BACKGROUND OF THE INVENTION

1. Field of the Invention

The present invention relates to a mobile object position detecting apparatus and method, and more particular to an apparatus and a method for warning of inability to detect a position due to faulty equipment.

2. Description of the Related Arts

Conventionally, there has been an emergency information device for detecting the current position of a vehicle and detecting the current positions of a navigation system for providing a guide to the destination so that the information about the occurrence of an accident, etc. and the position of the car can be transmitted in an emergency. In detecting the current position of the vehicle, a GPS device (Global Positioning System) has been widely used by a GPS receiver receiving and processing radio waves including the position information from a GPS satellite received by a GPS antenna of the GPS device, thereby detecting the current position.

However, the GPS antenna is normally provided in a position not easily checked by common users, and a ski carrier, a wiper, a metal film applied to the window of a vehicle, etc. in the reception area of the GPS antenna can disable radio waves to be received from the GPS satellite. Additionally, faulty connections to the GPS antenna and the GPS receiver or other faults can interrupt radio waves. In these cases, the current position a vehicle cannot be correctly measured. The following Patent Document 1 relates to an emergency information center apparatus, and designates the current vehicle location including the travel range, the angular range, and the initial error of the vehicle from the travel locus according to the position information about the final measurement position when the on-board device using the position data only about the GPS transmits emergency information and the GPS system cannot measure the position.

[Patent Document 1]

Japanese Patent Laid-Open Publication No. 2002-279594

However, in the vehicle position designating method disclosed by the above-mentioned Patent Document 1, the current position cannot be correctly designated or the measuring process cannot be performed when abnormal reception of radio waves continues for a long time due to faulty equipment such as the interruption of the operation of the GPS antenna by any obstacles, a faulty connection or other faults of an antenna, etc.

Therefore, it is necessary to detect the presence/absence of receiving radio waves including position information, and warn a person in the vehicle of abnormal reception due to faulty equipment.

However, when a vehicle is traveling through a tunnel, in a mountainous area, among large buildings, etc., the radio waves from the GPS satellite often cannot be received due to geographic conditions which interrupt the GPS satellite and the GPS antenna. Therefore, if a warning is issued to a person in the vehicle only by detecting the presence/absence of receiving radio waves from the GPS satellite, then geographic conditions which may temporarily interrupt the radio waves can be reported as an incapability warning. This frequently bothers the person in the vehicle.

Therefore, the present invention aims to provide the mobile object position detecting apparatus for warning of abnormal reception due to faulty equipment without a warning for temporary incapable reception of position information due to geographic conditions.

SUMMARY OF THE INVENTION

The mobile object position detecting apparatus according to the present invention detects the position of a mobile object according to position information transmitted from an external position information transmission apparatus, and includes: reception status detection means for detecting the presence/absence of receiving position information; travel distance obtaining means for obtaining the travel distance of a mobile object receiving no position information; determination means for determining the abnormal reception due to faulty equipment when the travel distance exceeds a predetermined distance; and warning means for warning of the abnormal reception when the determination means determine the abnormal reception.

The mobile object position detecting apparatus according to the present invention detects the position of a mobile object according to position information transmitted from an external position information transmission apparatus, and includes: reception status detection means for detecting the presence/absence of receiving position information; traveling time obtaining means for obtaining the traveling time of a mobile object receiving no position information; determination means for determining the abnormal reception due to faulty equipment when the traveling time exceeds a predetermined time; and warning means for warning of the abnormal reception when the determination means determine the abnormal reception.

The mobile object position detecting apparatus further includes mobile object speed detection means for detecting the speed of a mobile object, wherein the traveling time of the mobile object is a real traveling time in which a speed of the mobile object is detected as greater than 0 km/h.

Additionally, in the mobile object detecting apparatus according to the present invention, a mobile object is a vehicle, and travel distance obtaining means obtain the travel distance based on the turn of wheels.

Furthermore, in the position detecting apparatus according to the present invention, determination means releases the determination of abnormality when position information is first received after determining abnormal reception.

The mobile object position detecting method according to the present invention detects the position of a mobile object according to position information transmitted from an external position information transmission apparatus, and includes: a reception status detecting step of detecting the presence/absence of receiving position information; a travel distance obtaining step of obtaining the travel distance of a mobile object receiving no position information; a determining step of determining the abnormal reception due to faulty equipment when the travel distance exceeds a predetermined distance; and a warning step of warning of the abnormal reception when the determining step determines the abnormal reception.

The mobile object position detecting method according to the present invention detects the position of a mobile object according to position information transmitted from an external position information transmission apparatus, and includes: a reception status detecting step of detecting the presence/absence of receiving position information; a traveling time obtaining step of obtaining the traveling time of a mobile object receiving no position information; a determining step of determining the abnormal reception due to faulty equipment when the traveling time exceeds a predetermined time; and a warning step of warning of the abnormal reception when the determining step determines the abnormal recep- The mobile object position detecting method further includes a mobile object speed detecting step of detecting the speed of a mobile object, wherein the traveling time of the mobile object is a real traveling time in which a speed of the mobile object is detected as greater than 0 km/h.

Additionally, in the position detecting method according to the present invention, a mobile object is a vehicle, and a travel distance obtaining step obtains the travel distance based on the turn of wheels.

Furthermore, in the position detecting method according to the present invention, a determining step releases a determination of abnormality when position information is first received after determining abnormal reception.

The mobile object position detecting apparatus according to the present invention detects the position of a mobile object according to position information transmitted from an external position information transmission apparatus, and includes: a position detector for receiving position information and detecting the position of a mobile object; a travel distance detector for detecting the information about the travel distance of the mobile object; a controller for computing the travel distance of the mobile object while the position detector is not receiving the position information based on the output of the position detector and the travel distance detector, and determining abnormal reception due to faulty equipment when the travel distance exceeds a predetermined distance; and a warning device for warning of the abnormal reception when the controller determines the abnormal reception.

The mobile object position detecting apparatus according to the present invention detects the position of a mobile object according to position information transmitted from an external position information transmission apparatus, and includes: a position detector for receiving position information and detecting the position of a mobile object; a timer for detecting a duration in which the position detector is not receiving the position information; a controller for defining the duration detected by the timer as a traveling time of the mobile object, and determining abnormal reception due to faulty equipment when the traveling time exceeds a predetermined time; and a warning device for warning of the abnormal reception when the controller determines the abnormal reception.

The mobile object position detecting apparatus according to the present invention further includes a mobile object speed detector for detecting the speed of a mobile object, wherein the timer detects the real traveling time of the mobile object while the mobile object speed detector is detecting the speed of the mobile object.

DESCRIPTION OF THE PREFERRED EMBODIMENTS

The preferred embodiments of the present invention (hereinafter referred to as embodiment) are described below with reference to the attached drawings. As an embodiment of the mobile object position detecting apparatus of the present invention, an emergency information apparatus of a vehicle having the function of detecting the position of a vehicle is described below.

Embodiment 1

Figure 1:
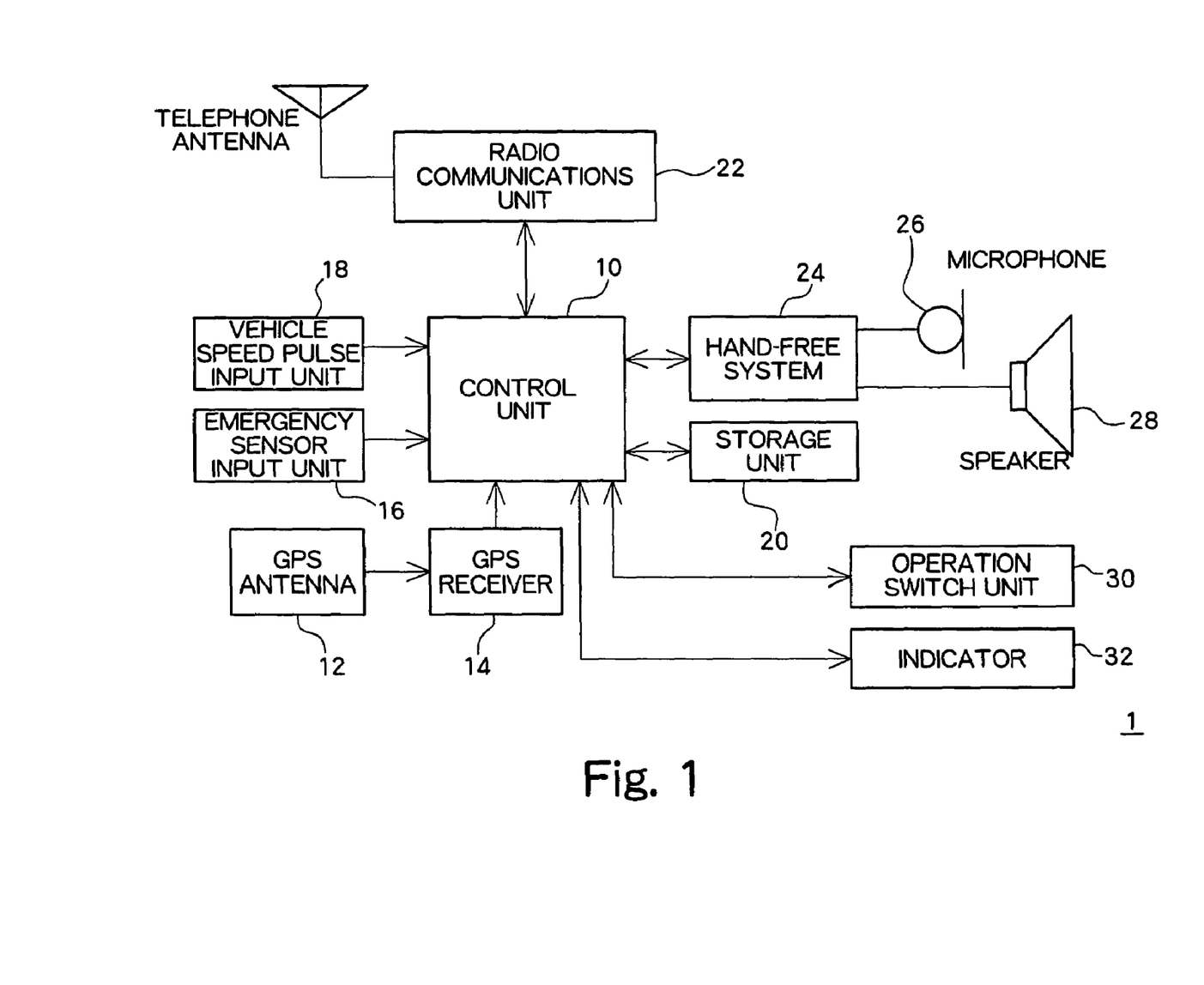
FIG. 1 shows the overall configuration of the emergency information apparatus of a vehicle according to the first embodiment of the present invention.

FIG. 1 shows the overall configuration of an emergency information apparatus 1 of a vehicle according to the present embodiment. The emergency information apparatus 1 of a vehicle detects the current position of the vehicle according to the position information transmitted from an external position information transmission apparatus, and informs a call center and an information destination (not shown in the attached drawings) such as a police station, a fire department, etc. in an emergency such as an accident or a fault of a vehicle, acute illness of a person in the vehicle, etc. of the position information about the vehicle and the nature of the emergency. In the present embodiment, the emergency information apparatus 1 warns of abnormal reception due to faulty equipment for position information.

The emergency information apparatus 1 is connected to each element described below, and comprises a control unit 10 for controlling the overall operation in various data processing operations. The control unit 10 normally comprises a CPU, ROM, RAM, etc., and processes digital data. In the present embodiment, the control unit 10 comprises, as described later, reception status detection means for detecting the presence/absence of receiving position information, travel distance obtaining means for obtaining the travel distance of a mobile object receiving no position information, and determination means for determining abnormal reception due to faulty equipment when a travel distance exceeds a predetermined distance.

The emergency information apparatus 1 comprises a position detection unit for detecting the position of a mobile object according to the position information transmitted from an external position information transmission apparatus. According to the present embodiment, the position detection unit is formed by a GPS device, and a GPS antenna 12 is connected to the control unit 10 through a GPS receiver 14. A GPS satellite as an external position information transmission apparatus transmits radio waves which are received by the GPS antenna 12, and the GPS receiver 14 detects the current position of the vehicle. That is, the radio waves from the GPS satellite include transmission time information from the GPS satellite, and the GPS receiver 14 detects the current position of the vehicle according to the transmission time information about the radio waves and the reception time information from the GPS receiver 14. Therefore, in the specifications, the position information is a concept that also includes the information about the time in which the position of a mobile object can be computed, etc. Additionally, by receiving error information contained in the radio waves transmitted from the GPS satellite in the FM multiplex broadcast, the D-GPS device (differential GPS) for detecting a position with high precision can also be used as a position detection unit. In this case, the error information is included in the position information. The radio waves from the GPS satellite received by the GPS antenna 12 are processed by the GPS receiver 14, and 2D position data of latitude and longitude data, or 3D position data of latitude, longitude, and height are detected. The current position of the vehicle detected by the GPS receiver 14 is supplied to the control unit 10. It is also possible to supply the position information received by the GPS receiver 14 to the control unit 10, and the control unit 10 can detect the current position of a vehicle.

The control unit 10 is connected to an emergency sensor input unit 16 to which an airbag-open signal, a crash signal, and other emergency signals warning of abnormal conditions of a vehicle are input. That is, the emergency sensor input unit 16 receives a signal from an emergency sensor provided for the vehicle, converts it into predetermined digital data, and supplies the result to the control unit 10.

In the present embodiment, the control unit 10 is connected to a vehicle speed pulse input unit 18 for supplying a vehicle speed pulse signal generated with rotation of the wheels of the vehicle to the control unit 10. Thus, the control unit 10 can compute the travel distance of the vehicle, and can determine the abnormal reception of position information due to faulty equipment based on the presence/absence of receiving position information and the travel distance of the vehicle.

The storage unit 20 stores the phone numbers of information destinations in advance such as predetermined rescue missions, for example, a police station, a fire department, a service center, etc., and the ID of the vehicle to which it belongs. The storage unit 20 can also store the position data of the vehicle, to which it belongs, detected by the GPS receiver 14. Thus, for example, when an accident occurs, etc. and if position information has not been received, the position information immediately before the current point or about the past can be read from the storage unit 20 and transmitted to the information destination. The storage unit 20 can be any of semiconductor memory, a hard disk, CD-ROM, etc. The data of the storage unit 20 can be provided for the control unit 10 at a request of the control unit 10.

The emergency information apparatus 1 comprises a radio communications unit 22 as a communications device. The radio communications unit 22 can be a terminal of various types of mobile communications, for example, a mobile phone.

The radio communications unit 22 is connected to the control unit 10, and the control unit 10 controls the communications of data. For display, when the control unit 10 receives an emergency signal from the emergency sensor input unit 16, it controls the radio communications unit 22, and an emergency signal, the current position of a vehicle, etc. are transmitted to an information destination.

The control unit 10 is connected to a microphone 26 and a speaker 28 through a hands-free system 24. The microphone 26 is used in inputting various information by a user, and can receive voice input. The speaker 28 is used in outputting various voice data, and outputs voice information from an information destination. For example, when an information destination issues an inquiry after emergency information is transmitted to the information destination, the user can communicate with the information destination in a handsfree state using the microphone 26 and the speaker 28.

The control unit 10 is connected to an operation switch unit 30 as input means for a user. The control unit 10 is also connected to an indicator 32 indicating the operation status of the emergency information apparatus 1.

Figure 2:
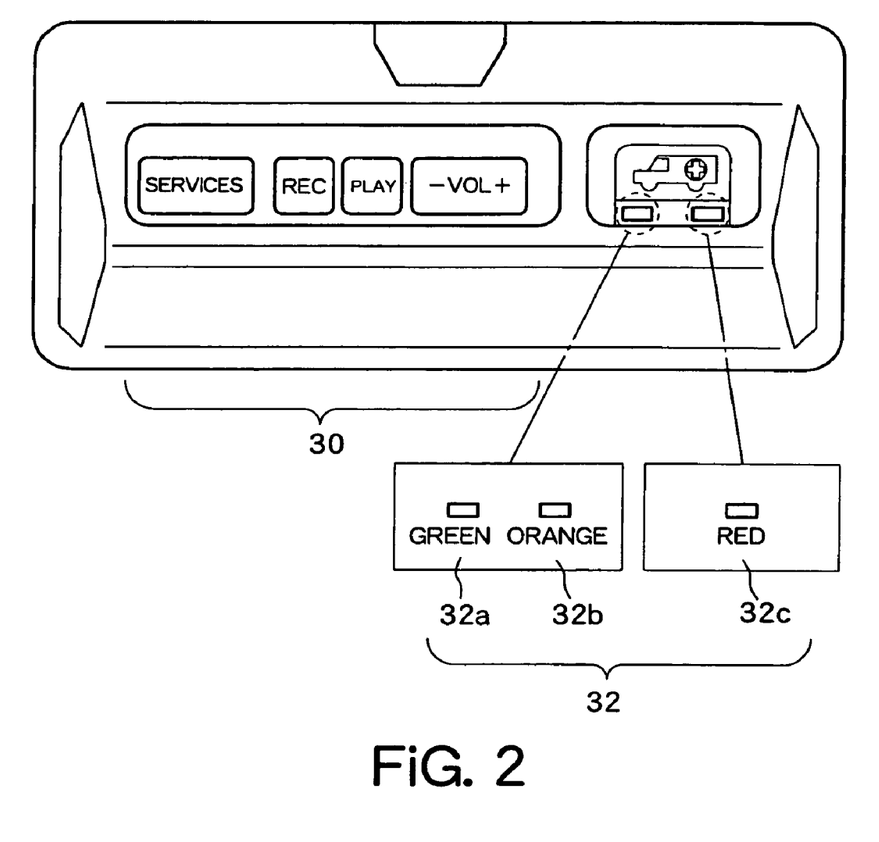
FIG. 2 shows the appearance of the emergency information apparatus according to the first embodiment of the present invention.

FIG. 2 shows the appearance of the emergency information apparatus 1 according to the present embodiment. For example, the operation switch unit 30 and the indicator 32 are provided near the driver seat for easy access and drive by a driver.

The operation switch unit 30 includes an emergency switch, a volume control switch, etc. for control of various input. When an accident, an acute illness, a fault of a vehicle, etc. occurs, a person in the vehicle operates an emergency switch to supply an emergency signal from the emergency switch to the control unit 10, and the control unit 10 controls the radio communications unit 22 and notifies the destination information for the emergency.

In the present embodiment, the indicator 32 warns of abnormal reception due to faulty equipment for position in formation. As shown in FIG. 2, the indicator 32 comprises indicators of three colors, that is, a green indicator 32a, an orange indicator 32b, and a red indicator 32c. The green indicator 32a is turned on when the apparatus is normally operated, when an emergency service contract is signed, etc. The orange indicator 32b is turned on when abnormal reception occurs due to faulty equipment. The red indicator 32c is turned on when the apparatus is in a faulty condition. Faulty conditions refer to the case in which the GPS device itself is in a normal condition, but any obstacle such as a ski carrier, a wiper, a metal film applied to the window of a vehicle, etc. interrupts radio waves, the GPS antenna 12 has a faulty connection, or the GPS antenna 12 or the GPS receiver 14 is in a faulty condition. In the present embodiment, the faults of the GPS antenna 12 and the GPS receiver 14 are detected by the fault detection circuit provided for the GPS device. Therefore, when the fault detection circuit detects a fault, the red indicator 32c is turned on. When there is no fault detection circuit, the fault of the apparatus itself can also be warned of by the orange indicator 32b. Thus, since the abnormal reception due to faulty equipment turns on the orange indicator 32b, the person in the vehicle can recognize the abnormal reception of position information due to faulty equipment. As a result, the person in the vehicle can check the facilities, repair them, and allow the position information to be correctly received. The indicator 32 can warn of an emergency by lighting or blinking. As means for warning of abnormal reception due to faulty equipment, the abnormal reception can be indicated not by an indicator, but by a display, voice output, etc.

Described below is the determination of abnormal reception due to faulty equipment mainly from the control unit 10. As described above, the control unit 10 realizes the reception status detection means, the travel distance obtaining means, and the travel distance obtaining means.

As described above, the control unit 10 is provided with 2D or 3D position data from the GPS receiver 14. According to the position data provided from the GPS receiver 14, the control unit 10 detects the presence/absence of receiving position information. When position data can be detected, the position information is received. When position data cannot be detected, it is determined that position information cannot be received. When position data is not supplied by the GPS receiver 14, the control unit 10 computes the travel distance of the vehicle. In the present embodiment, the computation of the travel distance is performed based on the vehicle speed pulse signal and the diameter of the tires of the vehicle input from the vehicle speed pulse input unit 18. The control unit 10 computes the travel distance (as the duration) from the time when no position information is provided by the GPS receiver 14 to the time when position information can be provided again by the GPS receiver 14. That is, the control unit 10 computes the travel distance in which position information is not received. The control unit 10 determines abnormal reception due to faulty equipment when the obtained travel distance exceeds a predetermined distance.

When the GPS device cannot receive radio waves from a GPS satellite, there can be reception disability due to a geographic condition or abnormal reception due to faulty equipment as described above. When the problem is reception disability due to a geographic condition, position information can be received when the vehicle exits a reception disability area such as a tunnel, etc. Therefore, while the vehicle is traveling in a reception disability area, the abnormal reception due to faulty equipment cannot be determined. Therefore, a warning of abnormal reception is to be suppressed. According to the present embodiment, when a computed travel distance exceeds a predetermined distance, the abnormal reception due to faulty equipment is determined. In this case, the predetermined distance can be set in advance. It can be set based on the country, or the area the vehicle mainly travels around. For example, when a vehicle travels downtown, 1, 2, or 3 km is set as a predetermined distance required to exit a tall building area. A predetermined distance can also be set based on an average length of tunnels. Thus, abnormal reception can be discriminated from reception disability when a warning of abnormal reception is given to a person in the vehicle. Furthermore, a predetermined distance can also be set based on the longest reception disability area, for example, the longest tunnel. For example, in the U.S.A., a predetermined distance can be set as 10 miles including a margin added to the basic length of 7.2 miles which is the length of the longest tunnel in the country. Thus, abnormal reception can be correctly discriminated from reception disability when a warning of abnormal reception is given to a person in the vehicle. The predetermined distance can be stored in the ROM of the control unit 10.

When the control unit 10 determines abnormal reception due to faulty equipment, it turns on the orange indicator 32b. Thus, the person in the vehicle can be informed of the abnormal reception due to the faulty equipment. According to the warning, the person in the vehicle can check and repair the facilities to improve the status of the facilities before an emergency occurs.

If the GPS receiver 14 first provides position data for the control unit 10 after the control unit 10 determines abnormal reception, the determination of abnormality is released. Correspondingly, the warning works effectively until the release of the determination of abnormality after the determination is made. Thus, the person in the vehicle can be prevented from failing to recognize the warning.

Figure 3:
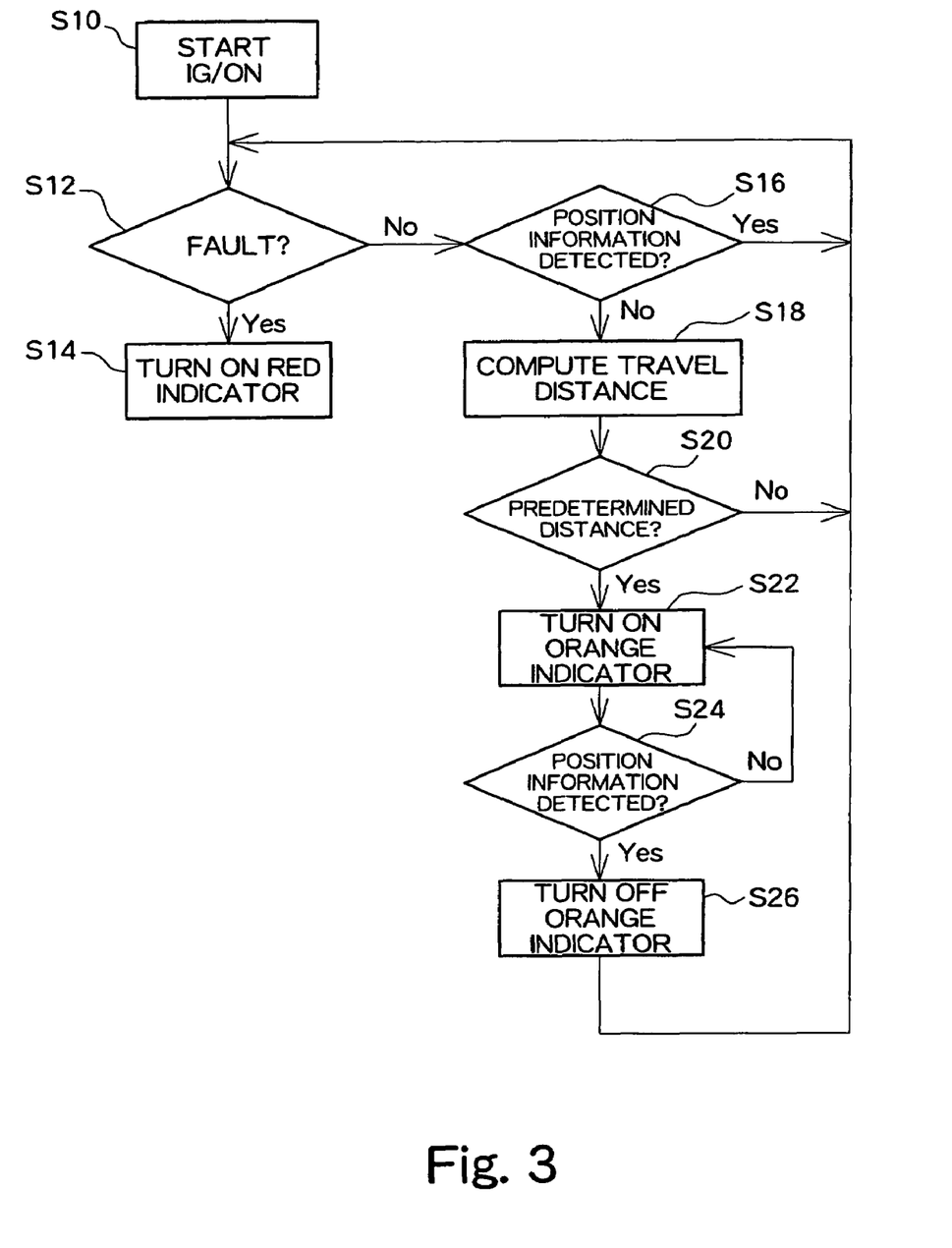
FIG. 3 is a flowchart of the operation of the emergency information apparatus according to the first embodiment.

Described below is the operation of the emergency information apparatus 1 according to the present embodiment. FIG. 3 is a flowchart of the operation of the emergency information apparatus 1.

First, when an ignition key is turned to the accessory position or the ON position, the emergency information apparatus 1 is turned on, thereby starting the operation of the emergency information apparatus 1 (S10).

Next, the fault detection circuit of the GPS device detects a fault (S12). For example, when the disconnection of the GPS antenna is detected (YES in S12), the red indicator 32c is turned on (S14). If no fault is detected (NO in S12), then control is passed to step S16.

The control unit 10 detects the presence/absence of receiving position information from a GPS satellite according to the position data provided from the GPS receiver 14 (S16). When no position data is detected (NO in S16), then the control unit 10 computes the travel distance of the vehicle not receiving position information (S18). The travel distance is computed based on the vehicle speed pulse signal provided from the vehicle speed pulse input unit 18. The control unit 10 determines whether or not the travel distance has exceeded a predetermined distance (S20). When the travel distance exceeds a predetermined distance (YES in S20), the control unit 10 determines abnormal reception due to faulty equipment, and turns on the orange indicator 32b (S22). Thus, the person in the vehicle can be warned of abnormal reception due to faulty equipment.

Then, the control unit 10 continues to detect the presence/absence of receiving position information from the GPS satellite (S24). When position data is not detected (NO in S24), the control unit 10 continues turning on the orange indicator 32b back in step S22. When position information is detected (YES in S24), the control unit 10 releases the determination of abnormality, turns off the orange indicator 32b (S26), and stops the warning.

If YES in S16 and NO in S20, abnormal reception due to faulty equipment cannot be determined, and control is returned to step S12 to repeat the processes.

Embodiment 2

In the above-mentioned Embodiment 1, the emergency information apparatus determines abnormal reception due to faulty equipment when position information is not received, and the travel distance exceeds a predetermined distance. According to the present embodiment, abnormal reception is determined when the traveling time of a mobile object not receiving position information is computed, and the traveling time exceeds a predetermined time.

Figure 4:
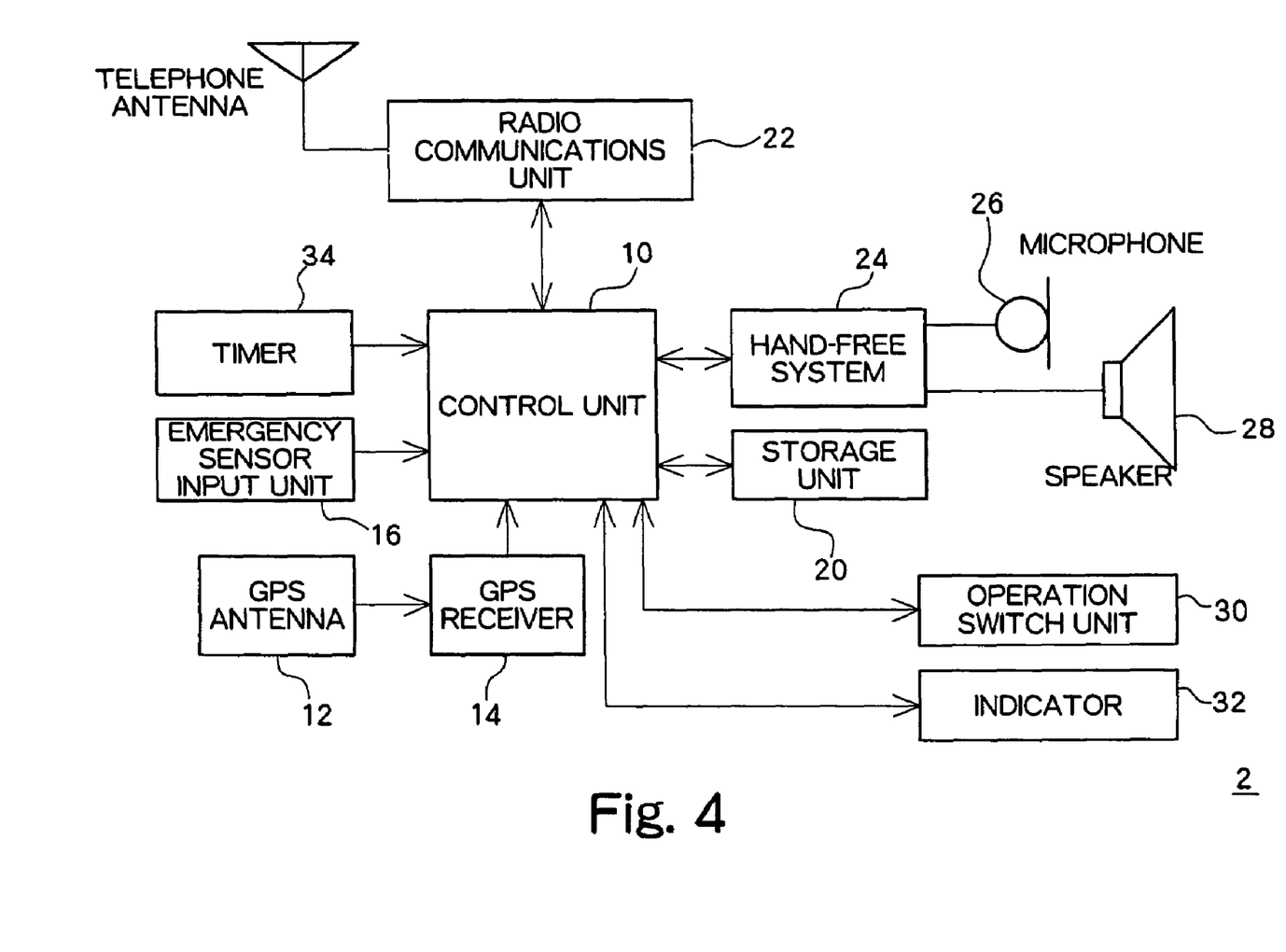
FIG. 4 shows the overall configuration of the emergency information apparatus of a vehicle according to the second embodiment of the present invention.

FIG. 4 shows the overall configuration of an emergency information apparatus 2 of a vehicle according to the present embodiment. As in the above-mentioned Embodiment 1, the same elements are assigned the same reference numerals, and repeated explanation is omitted here.

As shown in FIG. 4, the control unit 10 is connected to a timer 34 for computing the traveling time of a vehicle receiving no position information. The timer 34 measures the traveling time of a mobile object receiving no position information. That is, the control unit 10 starts the timer 34 when position data is not provided by the GPS receiver 14, and stops the timer 34 when the GPS receiver 14 provides position data. The timer 34 transmits the measured time (traveling time, duration) to the control unit 10, and the control unit 10 determines abnormal reception due to faulty equipment when the traveling time measured by the timer 34 exceeds a predetermined time.

In this case, the predetermined time can be set in advance as with the predetermined distance according to Embodiment 1, and can be set based on the country or area in which a vehicle mainly travels around, and on a limited speed or an average speed. For example, a reception disability area of large buildings of 1, 2, or 3 km long is divided by a limited speed to obtain a predetermined time. That is, the predetermined time refers to a reference time in which the vehicle can exit the reception disability area. For example, assuming that a vehicle normally travels a reception disability area of 3 km long at an average speed of 40 km/h, the predetermined time can be set to 5 min. including a margin. The predetermined time can also be set based on the longest reception disability time, for example, based on the longest reception disability area and a limited speed or an average speed. For example, in the U.S.A., when a vehicle travels through the longest tunnel of 10 miles (including a margin) at an average speed of 60 km/h, the predetermined time can be set to 15 min. Thus, abnormal reception can be correctly discriminated from reception disability when a warning of abnormal reception is given to a person in the vehicle.

Figure 5:
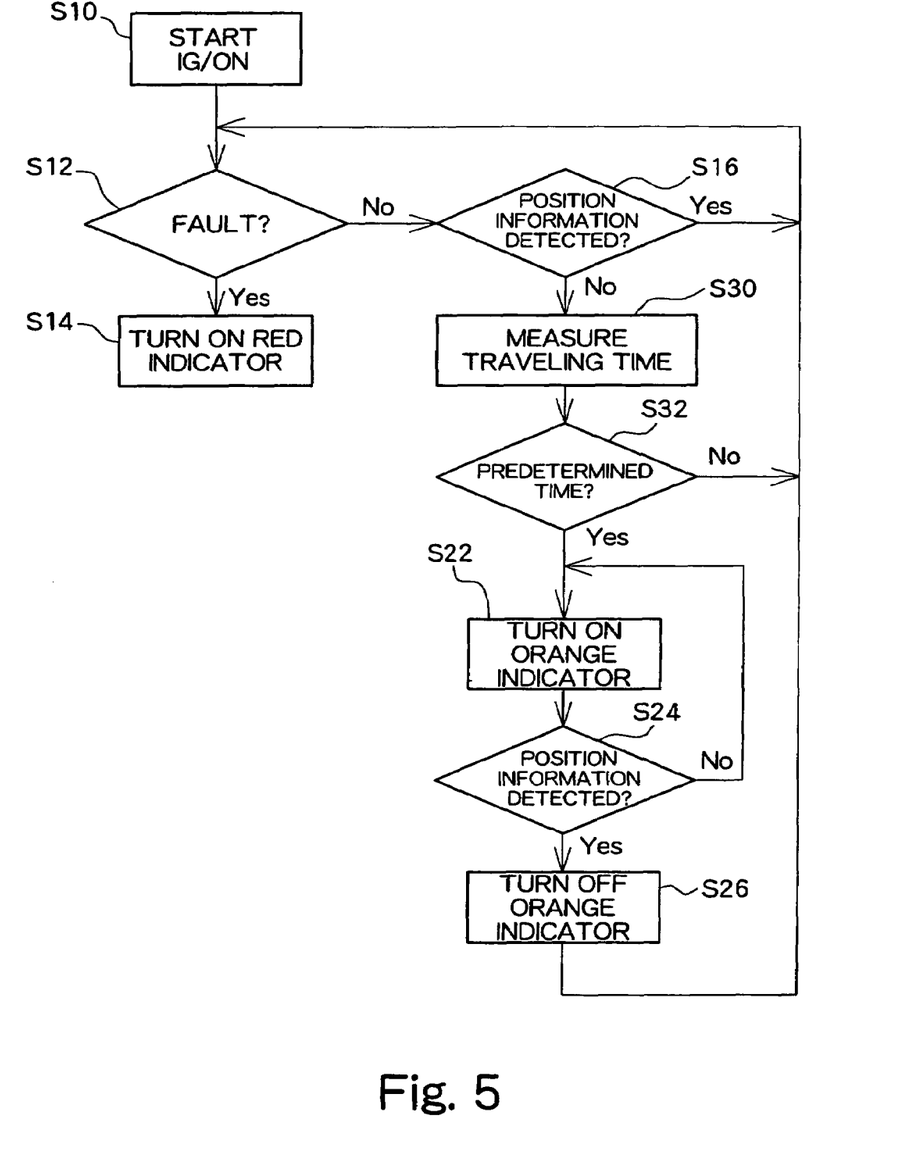
FIG. 5 is a flowchart of the operation of the emergency information apparatus according to the second embodiment of the present invention.

Simply described below is the operation of the emergency information apparatus 2 according to the present embodiment. FIG. 5 is a flowchart of the operation of the emergency information apparatus 2. In this case, the same step as in FIG. 3 is assigned the same step number, and repeated explanation is omitted here.

The differences from the flowchart according to the first embodiment shown in FIG. 3 are the processes in S18 and S20. That is, when position data is not detected (NO in S16), the timer 34 measures the traveling time of the vehicle receiving no position information (S30). The traveling time measured by the timer 34 is provided for the control unit 10, and the control unit 10 determines whether or not the traveling time has exceeded a predetermined time (S32). When the traveling time exceeds the predetermined time (YES in S32), the control unit 10 determines abnormal reception due to faulty equipment, and turns on the orange indicator 32*b* (S22). Thus, the person in the vehicle can be warned of the abnormal reception due to the faulty equipment.

Embodiment 3

In the above-mentioned Embodiment 2, the traveling time of a mobile object not receiving position information is computed, and abnormal reception is determined when the traveling time exceeds a predetermined time. However, in the emergency information apparatus 2 of the vehicle according to Embodiment 2, there is a possibility that the time in which a vehicle stops during the traveling time will be improperly measured as a traveling time. For example, when a vehicle repeats a stop state due to traffic congestion, it is possible that a determination of abnormality will be incorrectly made. The feature of the present embodiment is to accumulate the traveling time of a vehicle in which the vehicle is actually traveling so that abnormal reception can be correctly determined.

Figure 6:
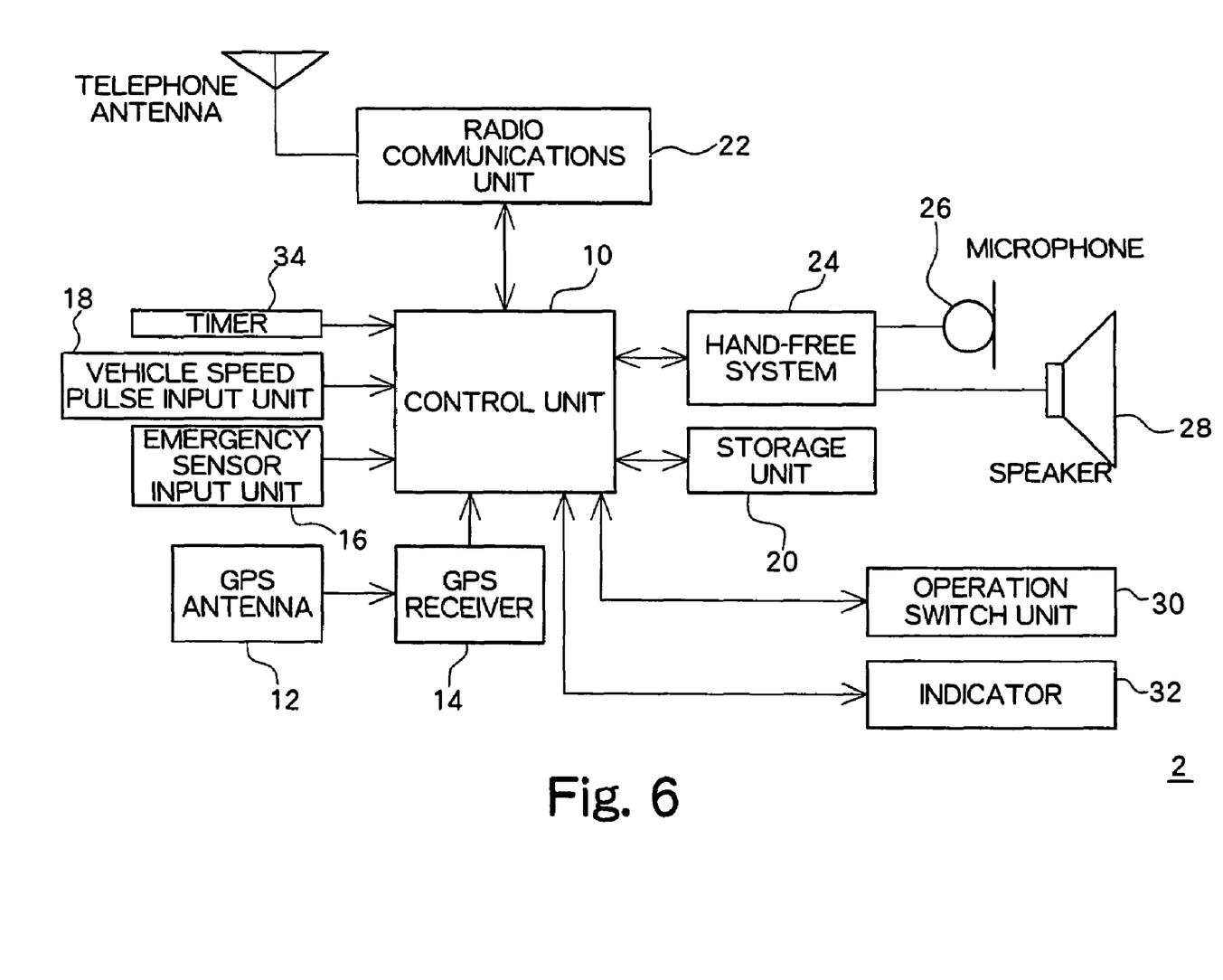
FIG. 6 shows the overall configuration of the emergency information apparatus of a vehicle according to the third embodiment of the present invention.

FIG. 6 shows the overall configuration of an emergency information apparatus 3 of a vehicle according to the present embodiment. The elements also shown in FIGS. 1 and 4, or corresponding elements are assigned the same reference numerals, and repeated explanation is omitted here. As shown in FIG. 6, the control unit 10 is connected to the vehicle speed pulse input unit 18 as in Embodiment 1. The vehicle speed pulse input unit 18 provides the control unit 10 with a vehicle speed pulse signal generated with the turn of the wheels of a vehicle. Thus, the control unit 10 can detect the vehicle speed. When the vehicle speed is detected (vehicle speed>0 km/h), the control unit 10 instructs the timer 34 to measure the time of the mobile object. That is, the time refers to the value obtained when the position information is not received and the vehicle speed is detected, that is, refers to the real traveling time (traveling time as a duration) of the vehicle. In detail, when the control unit 10 is provided with a vehicle speed pulse signal, the control unit 10 operates the timer 34 to measure the real traveling time. The timer 34 provides the measured real traveling time for the control unit 10. If the real traveling time exceeds a predetermined time, the control unit 10 determines abnormal reception due to faulty equipment. The predetermined time can be set in advance as in Embodiment 2.

Figure 7:
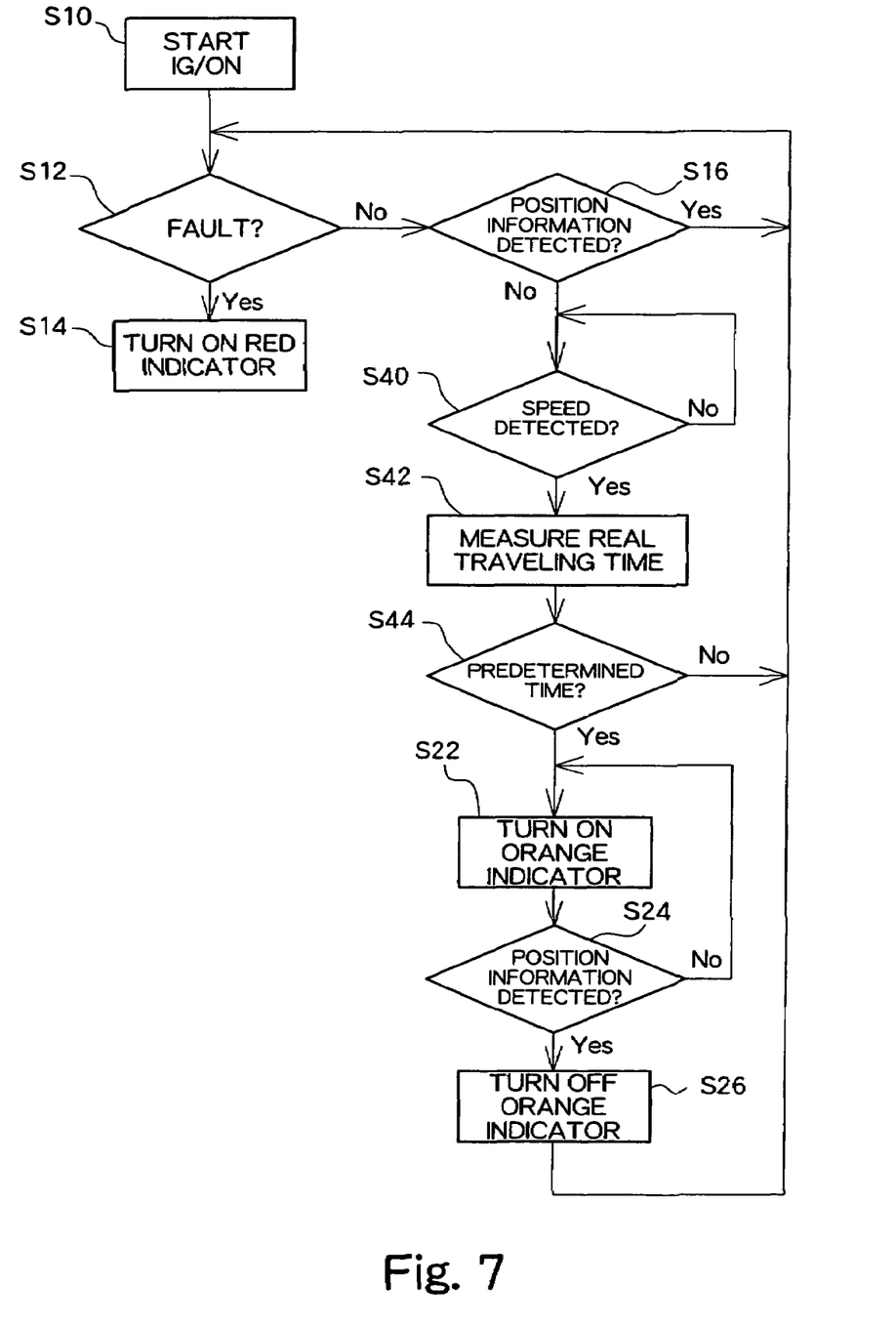
FIG. 7 is a flowchart of the operation of the emergency information apparatus according to the third embodiment of the present invention.

The operation of the emergency information apparatus 3 according to the present embodiment is described below. FIG. 7 is a flowchart of the operation of the emergency information apparatus 3. In this case, the steps also shown in FIG. 3 are assigned the same reference numerals, and repeated explanation is omitted here.

When position data is not detected (NO in S16), the control unit 10 determines whether or not the vehicle speed is detected (S40). If the vehicle speed is detected as greater than 0 km/h (YES in S40), then the timer 34 measures the time, that is, the real traveling time (S42). The real traveling time measured by the timer 34 is provided for the control unit 10. If the real traveling time exceeds a predetermined time (YES in S44), then the control unit 10 determines abnormal reception due to faulty equipment, and turns on the orange indicator 32*b* (S22). Thus, the person in the vehicle can be warned of the abnormal reception due to the faulty equipment.

OTHER EMBODIMENTS

The position detecting apparatus has been described above using an emergency information apparatus of a vehicle. However, the mobile object position detecting apparatus according to the present invention can also be applied to a navigation system for a route guide to a destination by detecting the current position of a vehicle, and a mobile phone having the function of detecting its position.

Furthermore, a vehicle has been described above as a mobile object, but it can be a plane, a boat, a bike, a person, etc. According to the present invention, when a travel distance or a traveling time exceeds a predetermined value as a determination condition, it is determined to be abnormal reception due to faulty equipment. Therefore, the predetermined distance and the predetermined time can be set based on type of mobile object and the geographic conditions such as the sky, the sea, and other obstacles in the geographic conditions under which the mobile object travels.

In the present embodiment, the position is detected by the GPS device, but the present invention can be applied to any device for detecting the position of a mobile object according to the position information transmitted from an external position information transmission apparatus.

The present invention may be embodied in other specific forms without departing from its essential characteristics. The described embodiment is to be considered in all respects only as illustrative and not as restrictive. The scope of the invention is, therefore, indicated by the appended claims rather than by the foregoing description. All changes which come within the meaning and range of the equivalence of the claims are to be embraced within their scope.

According to the present invention, a person in the vehicle can be warned of abnormal reception due to faulty equipment. Therefore, a reception disability status can be improved.

What is claimed is:

1. A movable object emergency information apparatus comprising
   a control unit;
   an antenna configured to receive radio waves from a satellite;
   a receiver configured to calculate vehicle position information of the movable object based on the received radio waves and supply the vehicle position information to the control unit;
   an emergency sensor configured to provide emergency information related to the movable object to the control unit;
   a speed detecting device configured to supply speed information of the movable object to the control unit;
   a timer configured to calculate a time during which the control unit does not receive vehicle position information from the receiver due to one or more of a plurality of faulty radio wave reception conditions, or due to geographic limitations to radio wave reception, and during which the speed information indicates that the movable object is traveling; and an indicator configured to warn an occupant of the movable object that reception of the radio waves has become abnormal due to one of the plurality of faulty radio wave reception conditions;

wherein the control unit is configured to determine the existence of faulty radio wave reception conditions when the calculated time exceeds a predetermined time.

2. The apparatus of claim 1, wherein the movable object is a wheeled vehicle and the speed detecting device provides the speed information based on a speed signal generated by wheel rotation.

3. The apparatus of claim 1, wherein the plurality of faulty radio wave reception conditions include interference with the radio waves by at least one of a component provided on the movable object or a faulty connection in the antenna or the receiver.

4. The apparatus of claim 1, wherein the control unit is further configured to disable the indicator from giving the warning when the position information is not received from the receiver, due only to geographic limitations to radio wave reception.

5. The apparatus of claim 1, wherein the emergency information provided by the emergency sensor includes at least one of airbag deployment, collision, and equipment malfunction.

6. The apparatus of claim 1, further comprising a voice transmitter and a receiver.

7. A movable object emergency information apparatus, comprising:
   a control unit;
   an antenna configured to receive radio waves from a satellite
   a receiver configured to calculate vehicle position information of the movable object based on the received radio waves and supply the vehicle position information to the control unit;
   an emergency sensor configured to provide emergency information related to the movable object to the control unit;
   a speed detecting device configured to supply speed information of the movable object to the control unit; and
   an indicator configured to warn an occupant of the movable object that reception of the radio waves has become abnormal due to one of a plurality of faulty radio wave reception conditions;
   wherein the control unit is configured to compute a travel distance of the movable object when the vehicle position information is not received from the receiver due to one or more of the plurality of faulty radio wave reception conditions, or else due to geographic limitations to radio wave reception.

8. The apparatus of claim 7, wherein the movable object is a wheeled vehicle and the speed detecting device provides the speed information based on a speed signal generated by wheel rotation.

9. The apparatus of claim 7, wherein the plurality of faulty radio wave reception conditions include interference with the radio waves by at least one of a component provided on the movable object, or a faulty connection in the antenna or the receiver.

10. The apparatus of claim 7, wherein the control unit is further configured to disable the indicator from giving the warning when the position information is not received from the receiver, due only to geographic limitations to radio wave reception.

11. The apparatus of claim 7, further comprising a timer configured to calculate a time the movable object travels without the control unit receiving position information; and
   wherein the control unit is configured to determine the existence of faulty radio wave reception conditions when the calculated time exceeds a predetermined time.

12. The apparatus of claim 7, wherein the emergency information provided by the emergency sensor includes at least one of airbag deployment, collision, and equipment malfunction.

13. The apparatus of claim 7, further comprising a voice transmitter and receiver.

14. The apparatus of claim 7, wherein the control unit is configured to determine the existence of faulty radio wave reception conditions when the computed travel distance exceeds a predetermined distance.

* * * * *